US010013822B2

(12) United States Patent
Kim et al.

(10) Patent No.: US 10,013,822 B2
(45) Date of Patent: Jul. 3, 2018

(54) WEARABLE DEVICE AND METHOD OF OPERATING THE SAME

(71) Applicant: SAMSUNG ELECTRONICS CO., LTD., Suwon-si, Gyeonggi-do (KR)

(72) Inventors: Hyeon-seong Kim, Hwaseong-si (KR); Hyun-chul Choi, Suwon-si (KR); Tae-hyun Yoon, Suwon-si (KR); Kang-eun Lee, Hwaseong-si (KR); Byeong-yong Jeon, Suwon-si (KR); Seong-hyeon Choe, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/211,069

(22) Filed: Jul. 15, 2016

(65) Prior Publication Data

US 2017/0018150 A1 Jan. 19, 2017

(30) Foreign Application Priority Data

Jul. 15, 2015 (KR) ........................ 10-2015-0100517

(51) Int. Cl.
*G06F 3/00* (2006.01)
*G07C 9/00* (2006.01)

(52) U.S. Cl.
CPC ........... *G07C 9/00* (2013.01); *G07C 9/00174* (2013.01); *G07C 2009/00809* (2013.01)

(58) Field of Classification Search
CPC ..... A61B 5/4504; G07C 9/00158; G08B 6/00
USPC ...................... 340/5.2, 566, 279, 5.82, 573.1
See application file for complete search history.

(56) References Cited

U.S. PATENT DOCUMENTS

| | | | | |
|---|---|---|---|---|
| 4,048,986 A * | 9/1977 | Ott | A61B 5/117 | 340/5.82 |
| 5,811,897 A * | 9/1998 | Spaude | B60R 25/2027 | 307/149 |
| 7,536,020 B2 * | 5/2009 | Fukumoto | G06F 1/163 | 340/384.6 |
| 7,725,089 B2 | 5/2010 | Lee et al. | | |
| 8,098,129 B2 * | 1/2012 | Falck | G07C 9/00087 | 340/5.53 |
| 8,693,306 B2 | 4/2014 | Hwang et al. | | |
| 9,020,170 B2 * | 4/2015 | Hosoi | H04R 25/554 | 381/151 |
| 9,075,437 B2 | 7/2015 | Kim | | |

(Continued)

FOREIGN PATENT DOCUMENTS

| | | |
|---|---|---|
| CN | 104702792 A | 6/2015 |
| EP | 2 882 174 | 6/2015 |

(Continued)

OTHER PUBLICATIONS

Search Report and Written Opinion dated Oct. 14, 2016 in counterpart International Patent Application No. PCT/KR2016/007646.

(Continued)

*Primary Examiner* — Firmin Backer
*Assistant Examiner* — Munear Akki
(74) *Attorney, Agent, or Firm* — Nixon & Vanderhye P.C.

(57) ABSTRACT

A wearable device communicating with an external device by using a vibration signal applied to a body part of a user wearing the wearable device, and a method of operating the wearable device are provided.

17 Claims, 14 Drawing Sheets

(56) References Cited

U.S. PATENT DOCUMENTS

| | | | | |
|---|---|---|---|---|
| 9,396,378 | B2 * | 7/2016 | Holz | G06K 9/00013 |
| 2004/0139348 | A1 * | 7/2004 | Norris, Jr. | B60R 25/23 713/186 |
| 2005/0207599 | A1 * | 9/2005 | Fukumoto | G06F 1/163 381/151 |
| 2007/0190940 | A1 | 8/2007 | Lee et al. | |
| 2010/0066664 | A1 * | 3/2010 | Son | G06F 1/163 345/156 |
| 2013/0149965 | A1 | 6/2013 | Gilad-Bachrach et al. | |
| 2013/0303144 | A1 | 11/2013 | Yehuday et al. | |
| 2014/0270416 | A1 | 9/2014 | Minteer et al. | |
| 2014/0334271 | A1 | 11/2014 | Park et al. | |
| 2014/0349597 | A1 | 11/2014 | Abolfathi et al. | |
| 2015/0149310 | A1 | 5/2015 | He et al. | |
| 2015/0160622 | A1 | 5/2015 | Kim et al. | |
| 2015/0182160 | A1 * | 7/2015 | Kim | A61B 5/0488 600/301 |
| 2015/0364018 | A1 * | 12/2015 | Mirov | G08B 6/00 340/407.1 |
| 2016/0275275 | A1 | 9/2016 | Wang et al. | |

FOREIGN PATENT DOCUMENTS

| | | |
|---|---|---|
| JP | 2012-038170 | 2/2012 |
| JP | 2014-003592 | 1/2014 |
| KR | 10-0793079 B | 1/2008 |
| KR | 10-2012-0771895 | 7/2012 |
| WO | WO 2015/083126 | 6/2015 |

OTHER PUBLICATIONS

EP Search Report dated May 2, 2018 for EP Application No. 16824736.9.

Office Action and Translation dated Apr. 30, 2018 for KR Application No. 10-2015-0100517.

* cited by examiner

WEARABLE DEVICE AND METHOD OF OPERATING THE SAME

CROSS-REFERENCE TO RELATED APPLICATION

This application is based on and claims priority under 35 U.S.C. § 119 to Korean Patent Application No. 10-2015-0100517, filed on Jul. 15, 2015, in the Korean Intellectual Property Office, the disclosure of which is incorporated by reference herein in its entirety.

BACKGROUND

1. Field

The present disclosure relates to a wearable device which performs contact-based communication and a method of operating the wearable device.

2. Description of Related Art

Wearable devices refer to devices which are worn on a user's body and perform a variety of computational tasks. The wearable devices may be implemented as various types of devices wearable on the user's body, such as a watch, glasses, and so forth.

SUMMARY

A wearable device which communicates a vibration signal in a contact-based manner and a method of operating the wearable device are provided.

Additional aspects will be set forth in part in the description which follows and, in part, will be apparent from the description.

According to an aspect of an example embodiment, a wearable device includes a controller configured to determine data to be delivered to an external device and a vibration delivery unit comprising vibration delivery circuitry configured to deliver, when the external device contacts a body part of a user, a vibration signal corresponding to the determined data to the external device by applying the vibration signal to the body part of the user.

The vibration delivery unit may include a modulator configured to perform modulation on the determined data using a preset modulation scheme and an actuator configured to convert the modulated data into the vibration signal and to apply the vibration signal to the body part of the user.

The wearable device may further include a support configured to suppress the vibration signal in directions other than a direction toward an inside of a body of the user, a pressure sensor configured to sense a pressure at which the vibration delivery unit and the body of the user closely contact each other, and a microphone configured to sense a sound generated due to the applied vibration signal.

The support may be further configured to cause the vibration delivery unit and the body of the user to closely contact each other based on the sensed pressure, such that a constant pressure is maintained between the vibration delivery unit and the body of the user.

The vibration delivery unit may be further configured to deliver a vibration signal for identifying the user to the external device contacting the body part of the user by applying the vibration signal to the body part of the user.

The controller may be further configured to determine the data based on a command of the user.

The wearable device may further include a vibration sensor configured to sense a first vibration signal of the external device through the body part of the user contacting the external device and a data recognition unit comprising data recognition circuitry configured to recognize first data corresponding to the first vibration signal, wherein the controller may be further configured to determine second data corresponding to the first data, and the vibration delivery unit may be further configured to convert the second data into a second vibration signal and deliver the second vibration signal to the external device through the body part of the user.

According to an aspect of another example embodiment, a wearable device includes a vibration sensor configured to sense a vibration signal of an external device through a body part of a user contacting the external device and a data recognition unit comprising data recognition circuitry configured to recognize data corresponding to the sensed vibration signal.

The data recognition unit may include a demodulator configured to restore the data by performing demodulation on the sensed vibration signal and a recognition unit configured to recognize the restored data.

The demodulator may be further configured to perform the demodulation using a demodulation scheme corresponding to a modulation scheme previously performed by the external device.

The wearable device may further include a microphone configured to sense a sound generated due to contact between the body part of the user and an external object, in which the vibration delivery unit is further configured to sense a vibration generated due to the contact and delivered through the body part of the user, and the data recognition unit is further configured to identify the user based on the sensed sound and vibration.

The data recognition unit may be further configured to determine a frequency response with respect to the user based on the sensed sound and vibration, and to identify the user based on the frequency response.

According to an aspect of another example embodiment, a method of operating a wearable device includes determining data to be delivered to an external device and delivering, when the external device contacts a body part of a user, a vibration signal corresponding to the determined data to the external device by applying the vibration signal to the body part of the user.

According to an aspect of another example embodiment, a method of operating a wearable device includes sensing a vibration signal of an external device through a body part of a user contacting the external device and recognizing data corresponding to the sensed vibration signal.

According to an aspect of another example embodiment, a non-transitory computer-readable recording medium having recorded thereon a program for executing the method of operating a wearable device on a computer is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
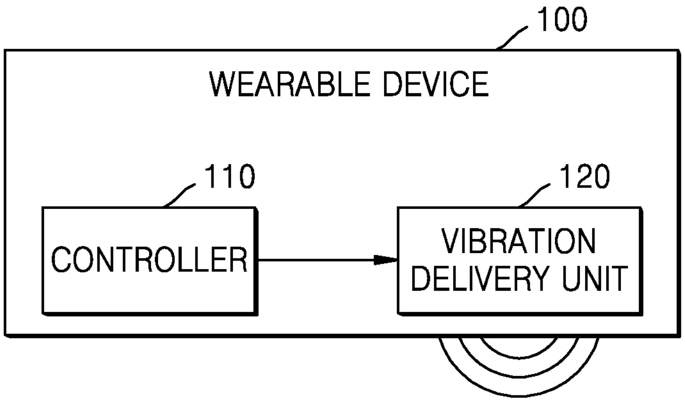
FIG. 1 is a block diagram illustrating an example wearable device.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

First, terms used herein will be described in brief and disclosed example embodiments will be described in greater detail.

Although the terms used herein are generic terms which are currently widely used and are selected by taking into consideration functions thereof, the meanings of the terms may vary according to the intentions of persons of ordinary skill in the art or the emergence of new technologies. Furthermore, some specific terms may be arbitrarily selected, in which case the meanings of the terms may be specifically defined in the description. Thus, the terms should be defined not by simple appellations thereof but based on the meanings thereof and the context of the description of the example embodiments.

Throughout the disclosure, when a part "comprises", "includes", or "has" an element, it means that the part further comprises, includes, or has another element rather than precluding the presence or addition of the another element. A term of a "unit" or a "module" used herein means a unit which processes at least one functions or operations, and may be implemented as hardware (e.g. including circuitry, processing circuitry, or the like), firmware software, or a combination of hardware and software.

Throughout the description, when it is mentioned that one part is "connected to" another part(s), this does not mean only a case of "directly connected to" but also a case of "indirectly connected to" while interposing another device(s) therebetween. Also, it is considered that to "include" one element means that the apparatus does not exclude other elements but may further include other elements, unless otherwise indicated.

Wearable devices 100, 100*a*, 100*b*, 200, 200*a*, and 300 mentioned herein mean devices that are worn on a user's body and are capable of performing computational tasks. For example, the wearable devices 100, 100*a*, 100*b*, 200, 200*a*, and 300 may be various types of devices wearable on a user's body, such as a watch, glasses, a band, a bracelet, a ring, a necklace, shoes, an earphone, a sticker, a patch, a clip, a hat, clothes, and the like.

In particular, the wearable devices 100, 100*a*, 100*b*, 200, 200*a*, and 300 may, for example, be a watch-type wearable device or a band-type wearable device. The band-type wearable device refers to a device that is worn using, for example, an elastic band on a user's body, for example, a head, an arm, a leg, a wrist, a finger, an ankle, a toe, or the like. Without being limited to these examples, the wearable devices 100, 100*a*, 100*b*, 200, 200*a*, and 300 may be implemented as types that are directly attachable to and removable from a user's body. For example, the wearable devices 100, 100*a*, 100*b*, 200, 200*a*, and 300 may be implemented as a patch type that may be attached to or removed from the user's body in a contact-based or non-contact manner. The wearable devices 100, 100*a*, 100*b*, 200, 200*a*, and 300 may be implemented as a type inserted into the user's body. For example, the wearable devices 100, 100*a*, 100*b*, 200, 200*a*, and 300 may be implemented as a particular type, such as epidermal electronics (or E-Skin) or an electronic (E)-tattoo, by being inserted into the skin of the body or inside the body through, for example, a medical operation.

Hereinbelow, example embodiments of the disclosure will be described in greater detail with reference to the accompanying drawings.

FIG. 1 is a block diagram illustrating an example wearable device 100.

According to an example embodiment, the wearable device 100 may include a controller 110 and a vibration delivery unit (e.g., including vibration delivery circuitry) 120. For the wearable device 100 illustrated in FIG. 1, only elements associated with the present example embodiment are illustrated in FIG. 1. Thus, it will be understood by those of ordinary skill in the art that the wearable device 100 may further include other general-purpose elements in addition to the elements illustrated in FIG. 1.

The wearable device 100 may be worn on a body part of a user. For example, the wearable device 100 may further include a wearing portion (not illustrated) in a form that allows the wearable device 100 to be worn on the body part of the user.

The controller 110 may be configured to determine data to be delivered as information to an external device. The external device may refer, for example, to a device capable of communicating with the wearable device 100. The external device may be one of various types such as a wearable device, a smartphone, a tablet computer, and the like.

According to an example embodiment, the controller 110 may be configured to determine data to be delivered to an external device based on a command of a user who wears the wearable device 100. For example, based on a sound or a character input to the wearable device 100, the controller 110 may determine data A to be delivered to the external device. According to an example embodiment, the controller 100 may determine the data to be delivered to the external device based on a user's motion or gesture recognized by the wearable device 100. For example, based on a user's gesture indicating the data A, the controller 110 may determine the data A to be delivered to the external device.

The controller 110 may include, for example, various circuitry, including a random access memory (RAM), a read only memory (ROM), a central processing unit (CPU), or a graphics processing unit (GPU). The RAM, the ROM, the CPU, and the CPU may be connected to each other through a bus.

The vibration delivery unit 120 converts the data determined by the controller 110 into a vibration signal and applies the vibration signal to the user's body part to deliver the vibration signal to the external device. For example, the vibration delivery unit 120 applies the vibration signal to the user's body part on which the wearable device is worn, to deliver the vibration signal to the external device that contacts the user's body part.

Figure 2:
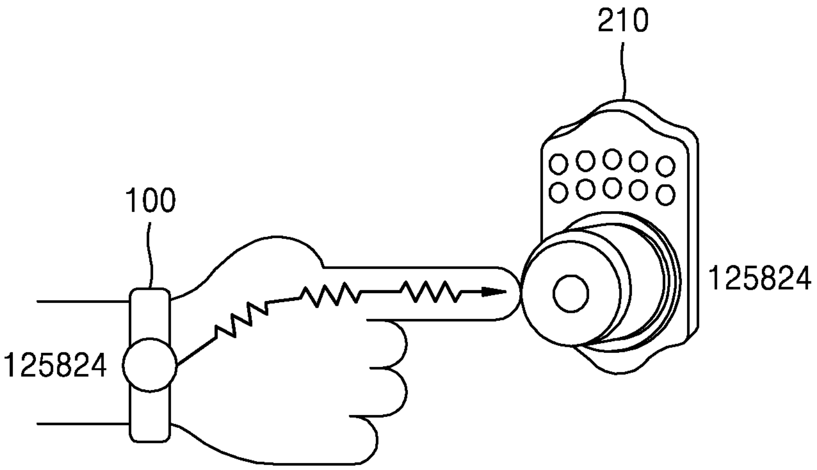
FIG. 2 is a diagram illustrating example operation of a wearable device.

FIG. 2 is a diagram illustrating an example operation of the wearable device 100.

As illustrated in FIG. 2, the wearable device 100 may, for example, be a watch type wearable device that is worn on a user's wrist.

For example, the wearable device 100 determines a password "125824", which is data to be delivered to an external device 210, based on a user's command. The wearable device 100 then converts the password "125824" into a vibration signal and applies the vibration signal to a user's finger to deliver the vibration signal to the external device 210 that contacts the user's finger. For example, the applied vibration signal passes through the inside of the user's body and is delivered to the external device 210 contacting the user's finger. Thus, the external device 210 receives the vibration signal and recognizes the password "125824" corresponding to the vibration signal.

According to another example embodiment, when the external device 210 is a portable terminal (e.g., a smartphone), if the user wearing the wearable device 100 contacts the portable terminal, the wearable device 100 delivers data indicating a password to the portable terminal through a vibration signal. The portable terminal then receives the vibration signal, recognizes the password corresponding to the vibration signal, and releases a lock function. Thus, the user wearing the wearable device 100 releases the lock function of the portable terminal merely based on a contact, without a separate password or recognition input, such as fingerprint recognition. Moreover, even when the user wears a glove, due to characteristics of the vibration signal, the user may release the lock function of the portable terminal merely with a contact. As used herein, the term contact does not necessarily mean direct contact, and may include indirect contact.

Figure 3:
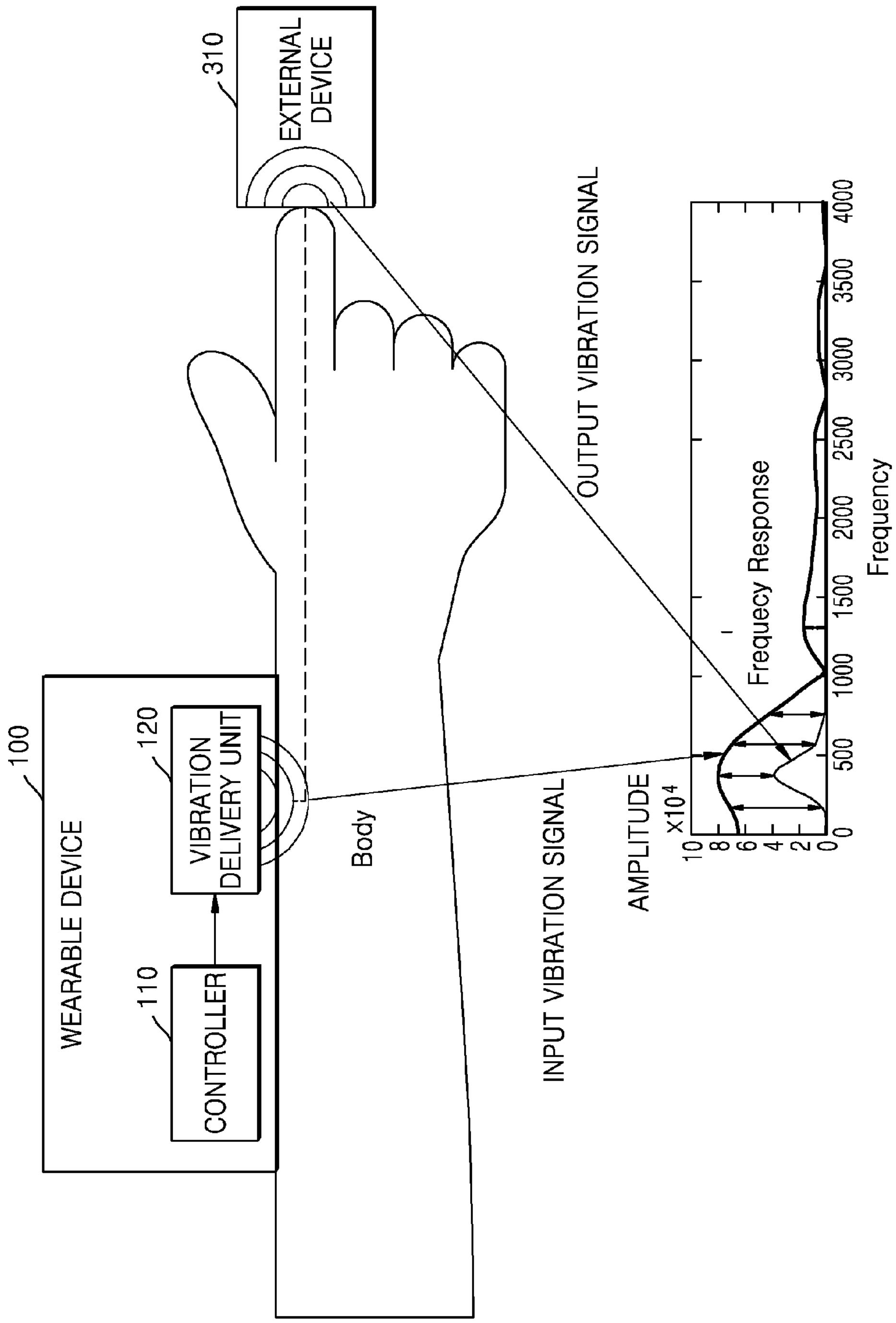
FIG. 3 is a diagram illustrating example operation of a wearable device.

FIG. 3 is a diagram illustrating an example operation of the wearable device 100.

The wearable device 100 applies an input vibration signal for identifying a user to a user's body part. For example, the wearable device 100 may apply an input vibration signal, which may, for example, be an impulse signal, to the user's body part to identify the user. The input vibration signal passes through the user's body part and is delivered as an output vibration signal to an external device 310 contacting the user's body part.

Since the external device 310 may obtain information about the input vibration signal in advance, the external device 310 may identify the user wearing the wearable device 100 based on the input vibration signal and the delivered output vibration signal. According to an example embodiment, the external device 310 may determine a frequency response with respect to the user based on the input vibration signal and the output vibration signal, and identifies the user based on the frequency response. For example, since the external device 310 obtains frequency response information regarding a plurality of users in advance and a medium forming a body part differs from user to user, the external device 310 may identify a user contacting the external device 310 from among the plurality of users based on a frequency response of the user contacting the external device 310.

Thus, the wearable device 100 applies the input vibration signal for user identification to the inside of the user body, and the external device 310 then identifies the user contacting the external device 310 based on the input vibration signal and output vibration signal passing through the user's body part.

According to another example embodiment, the external device 310 sends a signal requesting user identification (or a user identification request signal) to the wearable device 100 when the external device 310 senses a contact of the body of the user wearing the wearable device 100. The user identification request signal may be a signal used for non-contact communication such as Bluetooth. In response to the user identification request signal from the external device 310, the wearable device 100 applies a vibration signal to the body of the user. The input vibration signal then passes through the user's body part and is delivered as an output vibration signal to the external device 310 that contacts the user's body part.

In this way, the external device 310 may identify the user wearing the wearable device 100 based on the input vibration signal and the delivered output vibration signal.

For example, if a user A wearing the wearable device 100 holds a door lock system, which is the external device 310, by hand, the wearable device 100 may apply an input vibration signal to the inside of the body of the user A. If the user A wearing the wearable device 100 holds the door lock system, which is the external device 310, by hand, the wearable device 100 may apply an input vibration signal to the inside of the body of the user A in response to a user identification request signal from the door lock system. The door lock system may then receive an output vibration signal delivered by passing through the hand of the user A, and identify the user A contacting the door lock system based on the output vibration signal and the input vibration signal. Thus, the door lock system may identify the user A and release a lock function, without a separate input of a password.

In another example, if the user A wearing the wearable device 100 holds the portable terminal, which is the external device 310, by hand, the wearable device 100 may apply the input vibration signal to the inside of the body of the user A. If the user A wearing the wearable device 100 holds the portable terminal, which is the external device 310, by hand, the wearable device 100 may apply the input vibration signal to the inside of the body of the user A in response to a user identification request signal from the portable terminal. The portable terminal may then receive an output vibration signal delivered by passing through the hand of the user A, and identify the user A contacting the portable terminal based on the output vibration signal and the input vibration signal. Thus, the portable terminal may identify the user A and release a lock function, without a separate input of a password.

In this way, as the user wearing the wearable device 100 may contact nearby external devices, the external devices may identify the user and record the user's use history or life patterns, such that the wearable device 100 may implement lifelogging.

Figure 4:
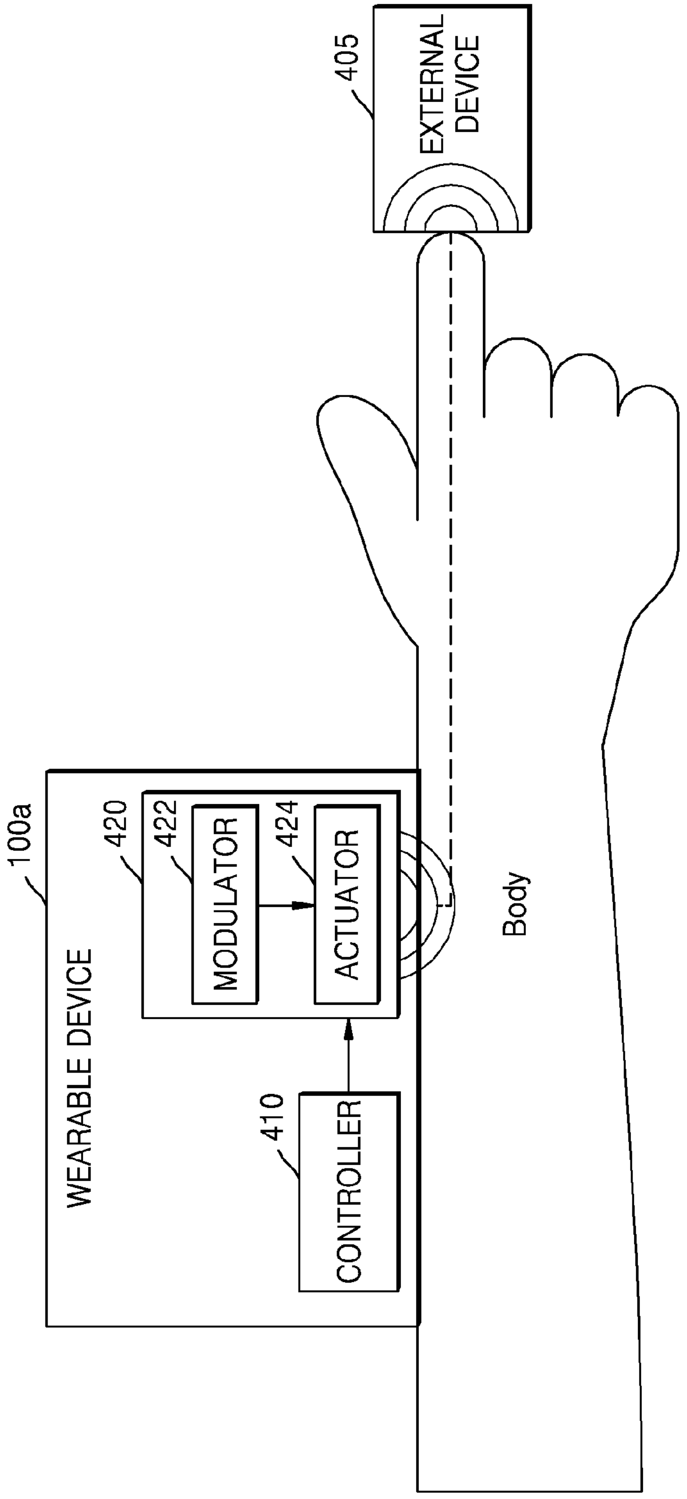
FIG. 4 is a diagram illustrating an example wearable device.

FIG. 4 is a diagram illustrating an example wearable device 100*a*.

According to an example embodiment, the wearable device 100*a* may include a controller 410 and a vibration delivery unit 420. For the wearable device 100*a* illustrated in FIG. 3, only elements associated with the current example embodiment are illustrated in FIG. 3. Thus, it will be understood by those of ordinary skill in the art that the wearable device 100*a* may further include other general-purpose elements in addition to the elements illustrated in FIG. 3.

The controller 410 may include details of the controller 110 and the vibration delivery unit 420 may include details of the vibration delivery unit 120 illustrated in FIG. 1, and thus descriptions thereof will not be repeated here.

According to an example embodiment, the controller 410 determines data to be delivered to an external device 405. The data to be delivered to the external device 405 may, for example, be voice data, character data, or image data. The data may be a waveform signal.

The vibration delivery unit 420 may include, for example, a modulator 422 and an actuator 424.

The modulator 422 performs modulation with respect to the data determined by the controller 410. According to an example embodiment, the modulator 422 performs modulation with respect to the data by, for example, using a low-frequency carrier that is useful for transmission in the body. According to an example embodiment, the modulator 422 generates an electrical signal as the modulated data. The modulator 422 performs modulation using a modulation scheme that varies based on the type of data determined by the controller 410. For example, the modulator 422 may perform modulation using a special modulation scheme for security-required data. For example, the wearable device 100*a* may perform encryption with respect to the data by executing the special modulation scheme.

The modulator 422 may perform modulation with respect to the data, taking frequency response characteristics of a user wearing the wearable device 100*a* into account. For example, if a user's frequency response is strong at a frequency, the modulator 422 may perform modulation with respect to the data by using frequency as a carrier frequency. As such, since modulation may be performed, taking the user's frequency response characteristics into account, the wearable device 100*a* may improve the delivery of the vibration signal, while reinforcing the security of the vibration signal.

The actuator 424 may convert the modulated data into a vibration signal according to an embodiment. For example, the actuator 424 may convert an electrical signal, which is the modulated data, into a physical vibration signal. The actuator 424 applies the converted vibration signal to a user's body part. Thus, by applying the converted vibration signal to a user's body part, the actuator 424 may deliver the converted vibration signal to the external device 405 contacting the user's body part.

According to an example embodiment, the controller 410 determines a modulation scheme, a carrier frequency for modulation, or a strength of a vibration signal. Thus, the modulator 422 performs modulation with respect to data indicating information, based on the modulation scheme and the carrier frequency determined by the controller 410. The actuator 424 applies the vibration signal to the user's body part based on the strength of the vibration signal determined by the controller 410. Thus, if the wearable device 100*a* is a watch type device, the wearable device 100*a* may adjust the carrier frequency or the strength of the vibration signal and applies the vibration signal to the whole hand of the user.

Since the wearable device 100*a* may adjust the carrier frequency or the strength of the vibration signal in this manner, a user's body area to which the vibration signal is to be delivered may also be determined.

Figure 5:
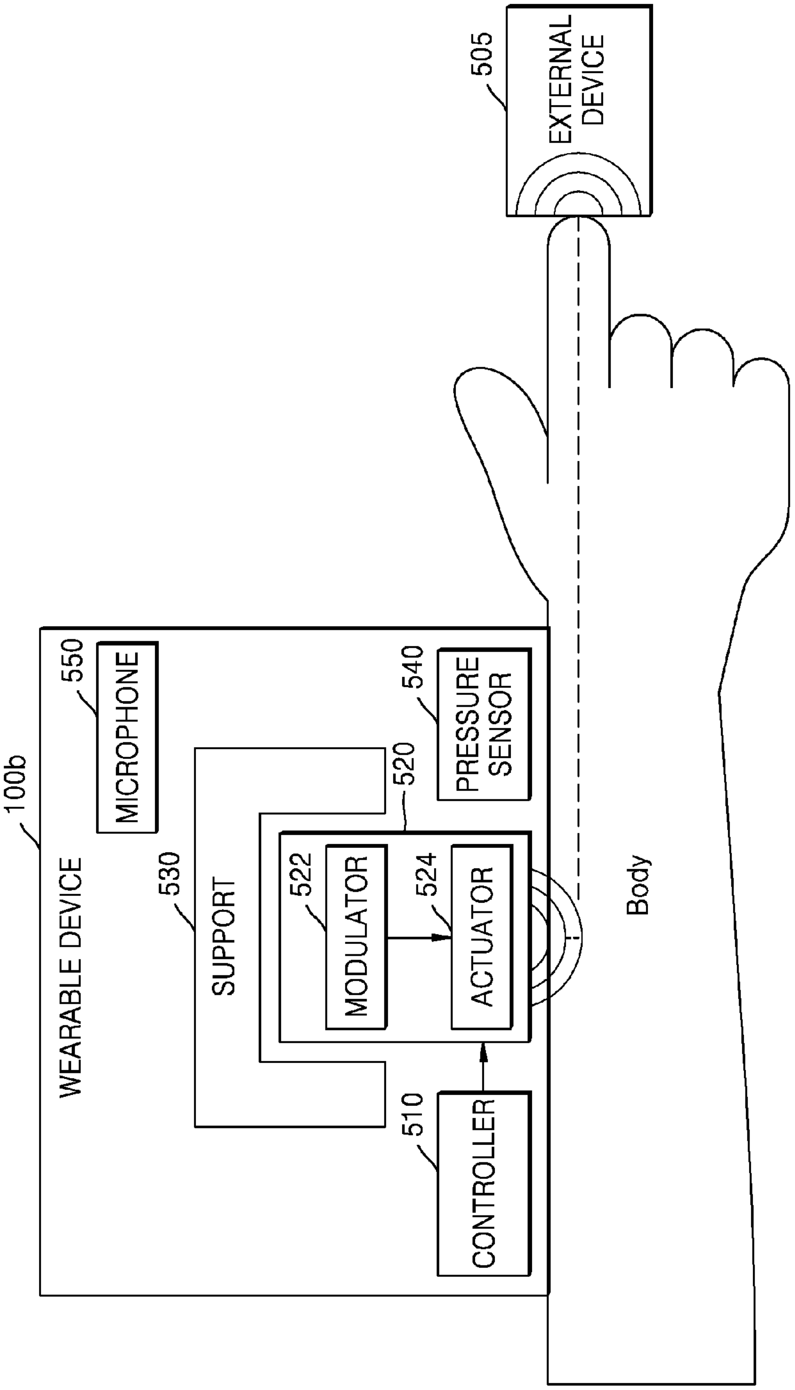
FIG. 5 is a diagram illustrating an example wearable device.

FIG. 5 is a diagram illustrating an example wearable device 100*b*.

According to an example embodiment, the wearable device 100*b* may include a controller 510, a vibration delivery unit 520, a support 530, a pressure sensor 540, and a microphone 550. For the wearable device 100*b* illustrated in FIG. 5, only elements associated with the current embodiment are illustrated in FIG. 5. Thus, it will be understood by those of ordinary skill in the art that the wearable device 100*b* may further include other general-purpose elements in addition to the elements illustrated in FIG. 5.

The controller 510 may include details of the controller 110 of FIG. 1 and the controller 410 of FIG. 4 and the vibration delivery unit 520 may include details of the vibration delivery unit 120 of FIG. 1 and the vibration delivery unit 420 of FIG. 4, and thus descriptions thereof will not be repeated here.

According to an example embodiment, the support 530 may be configured and arranged to suppress a vibration signal applied to the vibration delivery unit 520 in directions other than a direction toward the inside of the user body. For example, the support 530 may cause the vibration signal applied by the vibration delivery unit 520 to be applied in a direction toward the inside of the user body. According to an example embodiment, the support 530 may, for example, be formed of a damping material for suppressing vibration.

According to an example embodiment, the pressure sensor 540 senses a pressure at which the vibration delivery unit 520 and the user body closely contact each other, and the supporter 530 may cause the vibration delivery unit 520 and the user's body to closely contact each other based on the sensed pressure, such that a substantially constant pressure is maintained between the vibration delivery unit 520 and the user's body.

According to an example embodiment, the microphone 550 senses a sound generated due to the vibration signal applied to the inside of the user body. The controller 510 may also adjust a strength of the vibration signal to be applied to the user's body part, based on the strength of the sound sensed by the microphone 550. For example, if the strength of the sound sensed by the microphone 550 is less than a threshold value, the controller 510 may adjust the strength of the vibration signal to a greater strength than a previous strength.

The wearable device 100*b* may be vibrated by the vibration signal of the vibration delivery unit 520, and the microphone 550 may sense sound generated due to the vibration of the wearable device 100*b*. The controller 510 may adjust the strength of the vibration signal frequency-by-frequency based on the sound sensed by the microphone 550.

Figure 6:
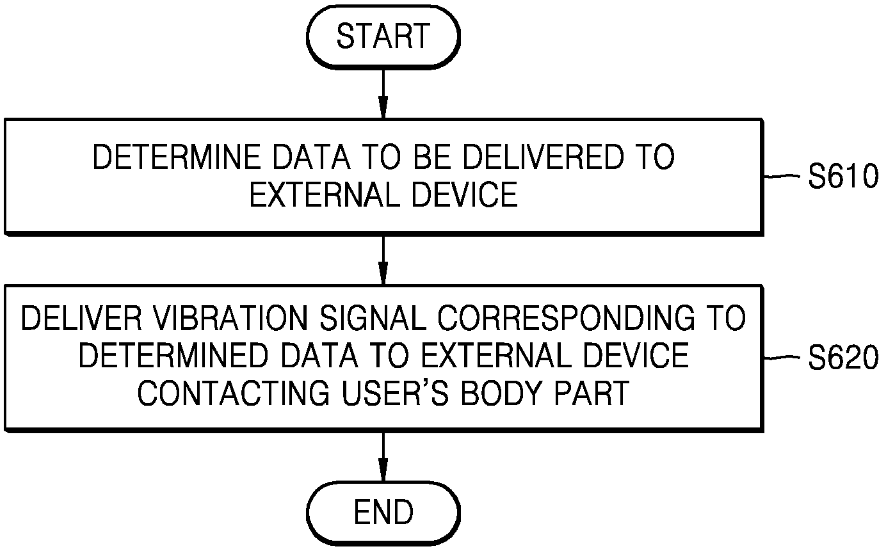
FIG. 6 is a flowchart illustrating an example method of operating a wearable device.

FIG. 6 is a flowchart illustrating an example method of operating the wearable devices 100, 100*a*, and 100*b*.

The method illustrated in FIG. 6 may be performed by the wearable device 100 of FIG. 1, the wearable device 100*a* of FIG. 4, and the wearable device 100*b* of FIG. 5, and descriptions thereof will not be repeated here.

In operation S610, the wearable device 100, 100*a*, or 100*b* determines data as information to be delivered to an external device. The data to be delivered to the external device may, for example, be voice data, character data, or image data. The data may, for example, be a waveform signal.

According to an example embodiment, the wearable device 100, 100*a*, or 100*b* may determine data to be delivered to the external device based on a command of a user wearing the wearable device 100, 100*a*, or 100*b*. For example, based on a sound or a character input to the wearable device 100, 100*a*, or 100*b*, the wearable device 100, 100*a*, or 100*b* may determine data A to be delivered to the external device. According to an example embodiment, the wearable device 100, 100*a*, or 100*b* may determine data to be delivered to the external device based on a user's motion or gesture recognized by the wearable device 100, 100*a*, or 100*b*. For example, based on a user's gesture indicating the data A, the wearable device 100, 100*a*, or 100*b* may determine the data A to be delivered to the external device.

The wearable device 100, 100*a*, or 100*b* applies an input vibration signal for user identification to a user's body part. For example, the wearable device 100, 100*a*, or 100*b* apply an input vibration signal, which may be an impulse signal, to the body of the user to identify the user. The input vibration signal passes through the user's body part and is delivered as an output vibration signal to the external device contacting the user's body part. Since the external device may obtain information about the input vibration signal in advance, the external device may identify the user wearing the wearable device 100, 100*a*, or 100*b* based on the input vibration signal and the delivered output vibration signal.

In operation S620, the wearable device 100, 100*a*, or 100*b* applies a vibration signal corresponding to the data determined in operation S610 to the user's body part to deliver the vibration signal to an external device contacting the user's body part.

According to an example embodiment, the wearable device 100, 100*a*, or 100*b* may perform modulation with respect to the data determined to be delivered to the external device. According to an example embodiment, the wearable device 100, 100*a*, or 100*b* may perform modulation with respect to data using a low-frequency carrier that is favorable to transmission in the body. According to an example embodiment, the wearable device 100, 100*a*, or 100*b* may generate the modulated data as an electrical signal. The wearable device 100, 100*a*, or 100*b* may perform modulation using a modulation scheme that differs with a type of the determined data. For example, the wearable device 100, 100*a*, or 100*b* may perform modulation by using a special modulation scheme for security-required data. The wearable device 100, 100*a*, or 100*b* may perform modulation with respect to data, by taking frequency response characteristics of the user wearing the wearable device 100, 100*a*, or 100*b* into account. For example, if the user's frequency response is strong at a frequency, the wearable devices 100, 100*a*, or 100*b* may perform modulation with respect to data by using the frequency as a carrier frequency.

According to an example embodiment, the wearable device 100, 100*a*, or 100*b* may convert the modulated data into a vibration signal. For example, the wearable device 100, 100*a*, or 100*b* may vibrate an electric signal, which is the modulated data, into a physical vibration signal. The wearable device 100, 100*a*, or 100*b* may apply the converted vibration signal into a user's body part. Thus, the wearable device 100, 100*a*, or 100*b* may apply the converted vibration signal to the user's body part to deliver the vibration signal to the external device contacting the user's body part.

According to an example embodiment, the wearable device 100, 100*a*, or 100*b* may determine a modulation scheme, a carrier frequency for modulation, or a strength of a vibration signal. Thus, the wearable device 100, 100*a*, or 100*b* may perform modulation with respect to data indicating information, based on the determined modulation scheme and carrier frequency. The wearable device 100, 100*a*, or 100*b* applies the vibration signal to the user's body part based on the determined strength. Thus, if the wearable device 100, 100*a*, or 100*b* is a watch type device, the wearable device 100, 100*a*, or 100*b* may adjust the carrier frequency or the strength of the vibration signal and apply the vibration signal to the whole hand of the user.

The wearable device 100, 100*a*, or 100*b* may sense a pressure at which the wearable device 100, 100*a*, or 100*b* and the user body closely contact each other, and may cause the wearable device 100, 100*a*, or 100*b* and the user's body to closely contact each other based on the sensed pressure, such that a constant pressure is maintained between the wearable device 100, 100*a*, or 100*b* and the user's body.

Figure 7:
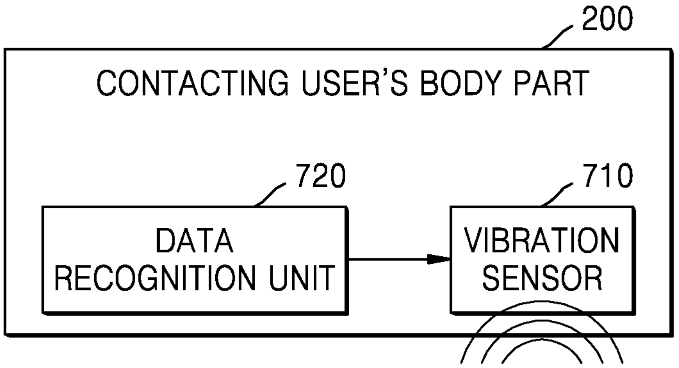
FIG. 7 is a block diagram illustrating an example wearable device.

FIG. 7 is a block diagram illustrating an example wearable device 200.

According to an example embodiment, the wearable device 200 may include a vibration sensor 710 and a data recognition unit (e.g., including data recognition circuitry) 720. For the wearable device 200 illustrated in FIG. 7, only elements associated with the current embodiment are illustrated in FIG. 7. Thus, it will be understood by those of ordinary skill in the art that the wearable device 200 may further include other general-purpose elements in addition to the elements illustrated in FIG. 7.

According to an example embodiment, the vibration sensor 710 may sense a vibration signal of an external device through a body part of a user contacting the external device. For example, the vibration sensor 710 senses a physical vibration signal delivered from the external device as an electrical vibration signal. The vibration sensor 710 may include a gyro sensor, a piezo sensor, or the like, which is capable of sensing a vibration signal.

According to an example embodiment, the data recognition unit 720 recognizes data corresponding to the vibration signal sensed by the vibration sensor 710. For example, the data recognition unit 720 restores data to be delivered by the external device, from the vibration signal sensed by the vibration sensor 710. The data recognition unit 720 may recognize the restored data.

Figure 8:
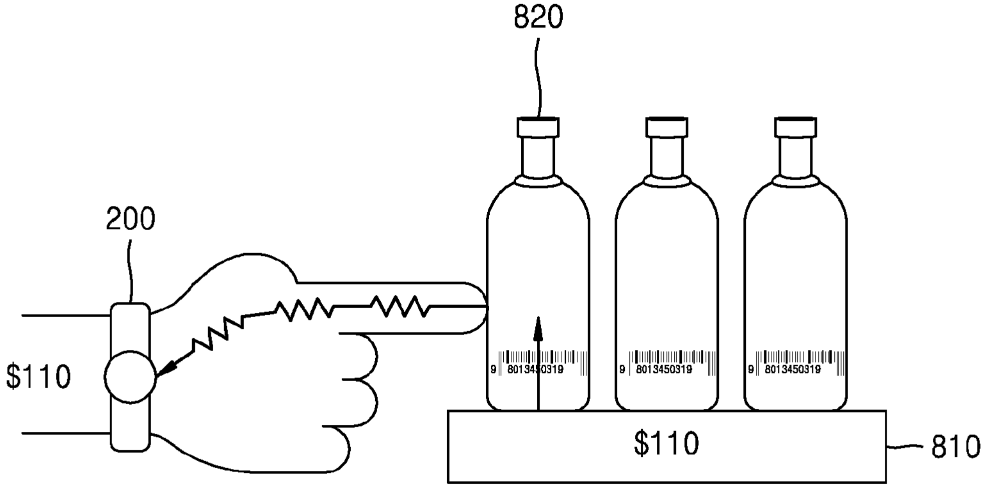
FIG. 8 is a diagram illustrating an example operation of a wearable device.

FIG. 8 is a diagram illustrating an embodiment in which the wearable device 200 operates.

As illustrated in FIG. 8, the wearable device 200 may, for example, be a watch type wearable device, which is worn on a user's wrist.

According to an example embodiment, a user's body part on which the wearable device 200 is worn may contact an object 820 that vibrates due to a vibration signal of an external device 810. Due to a contact between the vibrating object 820 and the user's body part, the wearable device 200 senses the vibration signal of the external device 810. The wearable device 200 restores data to be delivered by the external device 810 from the vibration signal of the external device 810. Thus, by recognizing the restored data, the wearable device 200 may recognize that the data to be delivered by the external device 810 is, for example, '110 dollars ($110)'. For example, the wearable device 200 may receive a message indicating that the price of the object 820 is 110 dollars from the external device 810 through the vibration signal.

Figure 9:
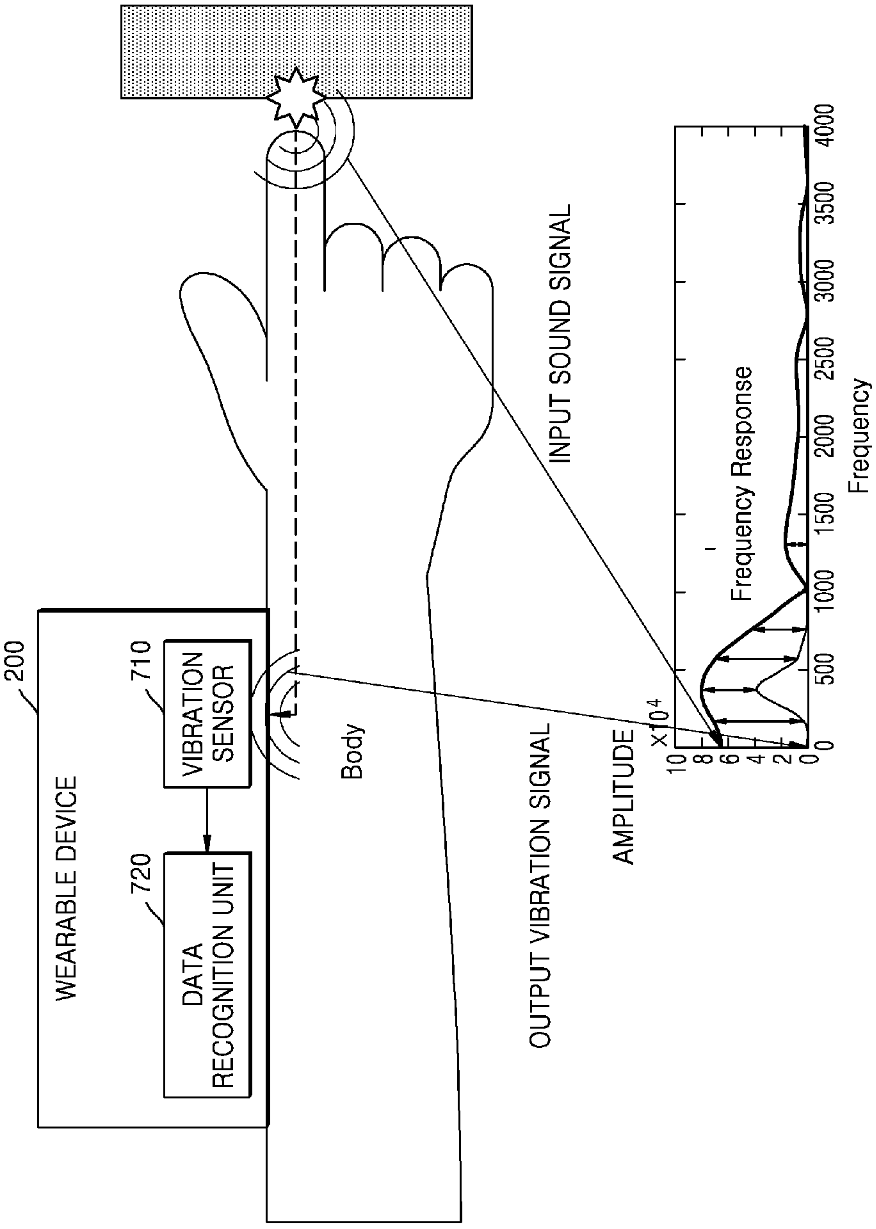
FIG. 9 is a diagram illustrating an example operation of a wearable device.

FIG. 9 is a diagram illustrating another example embodiment in which the wearable device 200 operates.

A user's body part on which the wearable device 200 is worn may contact an external object. As vibration and a sound are generated due to a contact between the user's body part and the external object, the wearable device 200 senses vibration delivered through the user's body part contacting the external object and recognizes the sound delivered on a space. For example, the wearable device 200 senses the sound delivered on the space using a microphone and senses the vibration delivered through the user's body part using the vibration sensor 710. For example, the wearable device 200 senses the sound on the space as an input signal and the vibration delivered through the user's body part as an output signal.

Thus, the wearable device 200 identifies the user wearing the wearable device 200 based on the input signal and the output signal. For example, the wearable device 200 identifies the user wearing the wearable device 200 through the data recognition unit 270. According to an example embodiment, the wearable device 200 may determine a frequency response with respect to the user based on the input signal and the output signal, and identifies the user based on the frequency response. For example, the wearable device 200 obtains frequency response information with respect to the user in advance, and identifies the user wearing the wearable device 200 based on matching or non-matching with the determined frequency response.

For example, the wearable device 200 may determine whether the user A wearing the wearable device 200 is a proper user. For example, the wearable device 200 senses a sound and vibration generated by a contact between a body part of the user A and an external object as an input signal and an output signal, and calculates a frequency response with respect to the user A based on the input signal and the output signal. Thus, the wearable device 200 may identify whether the user A is a proper user based on the calculated frequency response with respect to the user A. For example, if the user A is a proper user, the wearable device 200 may release a lock mode or a standby mode.

Figure 10:
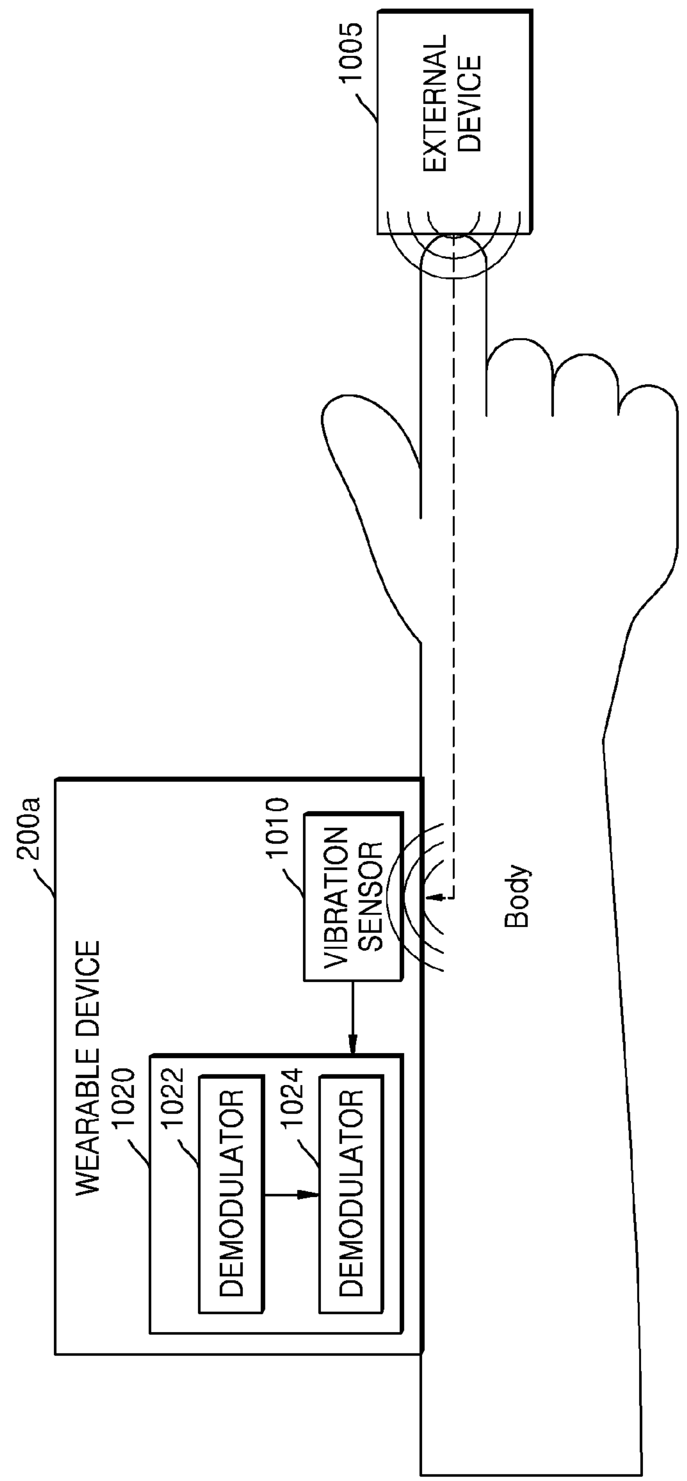
FIG. 10 is a diagram illustrating an example wearable device.

FIG. 10 is a diagram illustrating an example wearable device 200*a*.

According to an example embodiment, the wearable device 200*a* may include a vibration sensor 1010 and a data recognition unit 1020. For the wearable device 200*a* illustrated in FIG. 10, only elements associated with the current example embodiment are illustrated in FIG. 10. Thus, it will be understood by those of ordinary skill in the art that the wearable device 200*a* may further include other general-purpose elements in addition to the elements illustrated in FIG. 10.

The vibration sensor 1010 may include details of the vibration sensor 710 and the data recognition unit 1020 may include details of the data recognition unit 720 illustrated in FIG. 7, and thus descriptions thereof will not be repeated here.

According to an example embodiment, the vibration sensor 1010 senses a vibration signal of an external device 1005 through a user's body part contacting the external device 1005.

According to an example embodiment, the data recognition unit 1020 may include a demodulator 1022 and a recognition unit 1024.

According to an example embodiment, the demodulator 1022 performs demodulation with respect to the vibration signal sensed by the vibration sensor 1010. For example, the demodulator 1022 may perform corresponding to modulation performed by the external device 1005 with respect to the vibration signal to restore data to be delivered by the external device 1005. For example, if the external device 1005 performs modulation using a scheme B during generation of a vibration signal to deliver data A to the wearable device 200*a*, the demodulator 1020 performs demodulation using a scheme B' corresponding to the modulation using the scheme B with respect to the vibration signal of the external device 1005 to restore the data A to be delivered by the external device 1005.

According to an example embodiment, the demodulator 1022 may perform demodulation with respect to the vibration signal, taking frequency response characteristics of a user wearing the wearable device 200*a* into account.

The recognition unit 1024 recognizes the data restored by the demodulator 1022. For example, the recognition unit 1024 may recognize which text information, which image information, or which voice information the restored data is.

Figure 11:
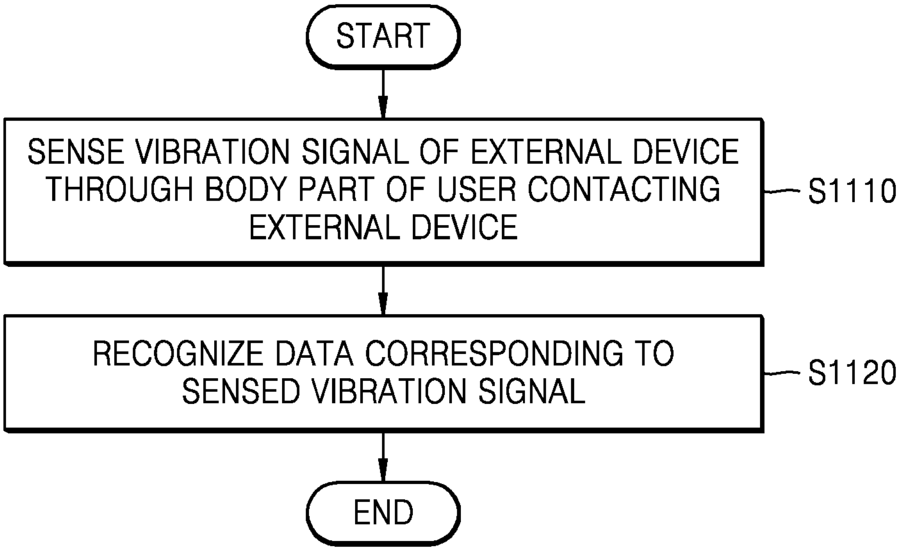
FIG. 11 is a flowchart illustrating an example method of operating a wearable device.

FIG. 11 is a flowchart illustrating an example method of operating the wearable devices 200 and 200*a*.

The method illustrated in FIG. 11 may be performed by the wearable device 200 of FIG. 7 and the wearable device 200*a* of FIG. 10, and descriptions thereof will not be repeated here.

In operation S1110, the wearable device 200 or 200*a* senses a vibration signal of an external device through a body part of a user contacting the external device. For example, the wearable device 200 or 200*a* senses a physical vibration signal delivered from the external device as an electric vibration signal.

According to an example embodiment, as vibration and a sound are generated by a contact between the user's body part and an external object, the wearable device 200 or 200*a* senses vibration delivered through the user's body part contacting the external object, and senses the sound delivered on the space. For example, the wearable device 200 or 200*a* senses the sound delivered on the space as an input signal and senses the vibration delivered through the user's body part as an output signal. Thus, the wearable device 200 or 200*a* identifies the user wearing the wearable device 200 or 200*a* based on the input signal and the output signal. According to an example embodiment, the wearable device 200 or 200*a* may determine a frequency response with respect to the user, based on the input signal and the output signal, and identifies the user based on the frequency response. For example, the wearable device 200 or 200*a* obtains frequency response information with respect to the user in advance, and identifies the user wearing the wearable device 200 or 200*a* based on matching or non-matching with the determined frequency response.

In operation S1120, the wearable device 200 or 200*a* recognizes data corresponding to the sensed vibration signal. According to an example embodiment, the wearable device 200 or 200*a* performs demodulation with respect to the vibration signal sensed in operation S1110. For example, the wearable device 200 or 200*a* performs demodulation corresponding to modulation performed by the external device with respect to the vibration signal to restore data to be delivered by the external device. For example, if the external device performs modulation using the scheme B during generation of the vibration signal to deliver the data A to the wearable device 200 or 200*a*, the wearable device 200 or 200*a* may perform demodulation using the scheme B' corresponding to the modulation using the scheme B with respect to the vibration signal of the external device to restore the data A to be delivered by the external device. According to an example embodiment, the wearable device 200 or 200*a* performs demodulation with respect to the vibration signal, taking frequency response characteristics of the user wearing the wearable device 200 or 200*a* into account.

The wearable device 200 or 200*a* recognizes the restored data. For example, the wearable device 200 or 200*a* recognizes which text information, which image information, or which voice information the restored data is.

Figure 12:
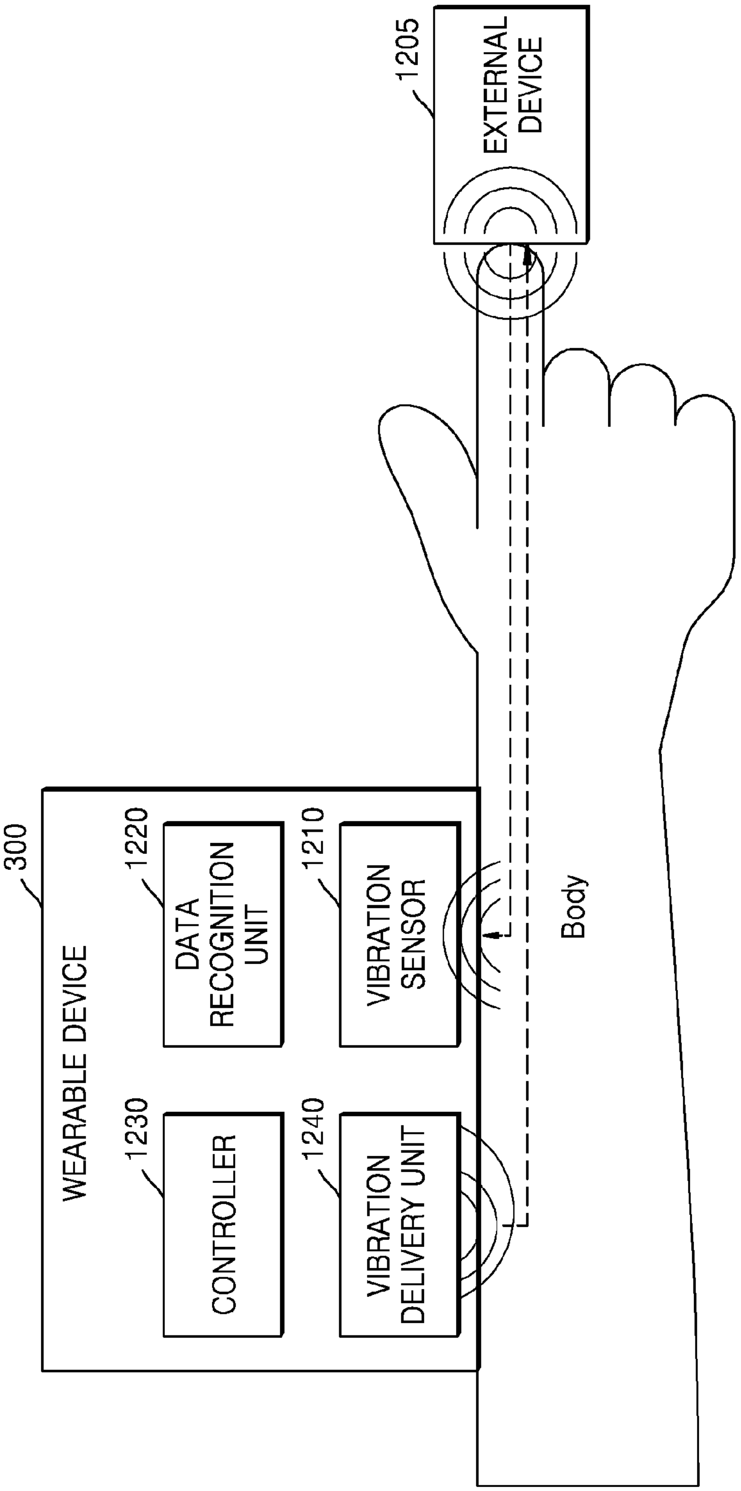
FIG. 12 is a diagram illustrating an example wearable device.

FIG. 12 is a diagram illustrating an example wearable device 300.

According to an example embodiment, the wearable device 300 may include a controller 1230, a vibration delivery unit (e.g., including vibration delivery circuitry) 1240, a vibration sensor 1210, and a data recognition unit (e.g., including data recognition circuitry) 1220. For the wearable device 300 illustrated in FIG. 12, only elements associated with the current embodiment are illustrated in FIG. 12. Thus, it will be understood by those of ordinary skill in the art that the wearable device 300 may further include other general-purpose elements in addition to the elements illustrated in FIG. 12.

The controller 1230 may include details of the controller 110 of FIG. 1 and the controller 410 of FIG. 4 and the vibration delivery unit 1240 may include details of the vibration delivery unit 120 of FIG. 1 and the vibration delivery unit 420 of FIG. 4, and thus descriptions thereof will not be repeated here. In addition, the vibration sensor 1210 may include details of the vibration sensor 710 of FIG. 7 and the vibration sensor 1010 of FIG. 10 and the data recognition unit 1220 may include details of the data recognition unit 720 of FIG. 7 and the data recognition unit 1020 of FIG. 10, and thus descriptions thereof will not be repeated here.

According to an example embodiment, the vibration sensor 1210 senses a first vibration signal of an external device 1205 through a body part of a user contacting the external device 1205.

According to an example embodiment, the data recognition unit 1220 recognizes first data corresponding to the first vibration signal sensed by the vibration sensor 1210. For example, the data recognition unit 1220 restores first data from the first vibration signal and recognizes the restored first data.

According to an example embodiment, the controller 1230 determines second data corresponding to the first data recognized by the data recognition unit 1220. For example, the controller 1230 determines the second data to be delivered to the external device 1205 based on the recognized first data. For example, the wearable device 300 may receive the first data requesting information A from the external device 1205 and determine the second data indicating the information A.

According to an example embodiment, the vibration delivery unit 1240 applies a second vibration signal corresponding to the second data determined by the controller 1230 to the user's body part and delivers the second vibration signal to the external device 1205. For example, the vibration delivery unit 1240 converts the second data into the second vibration signal and applies the converted second vibration signal to the user's body part, thus delivering the second vibration to the external device 1205.

Figure 13:
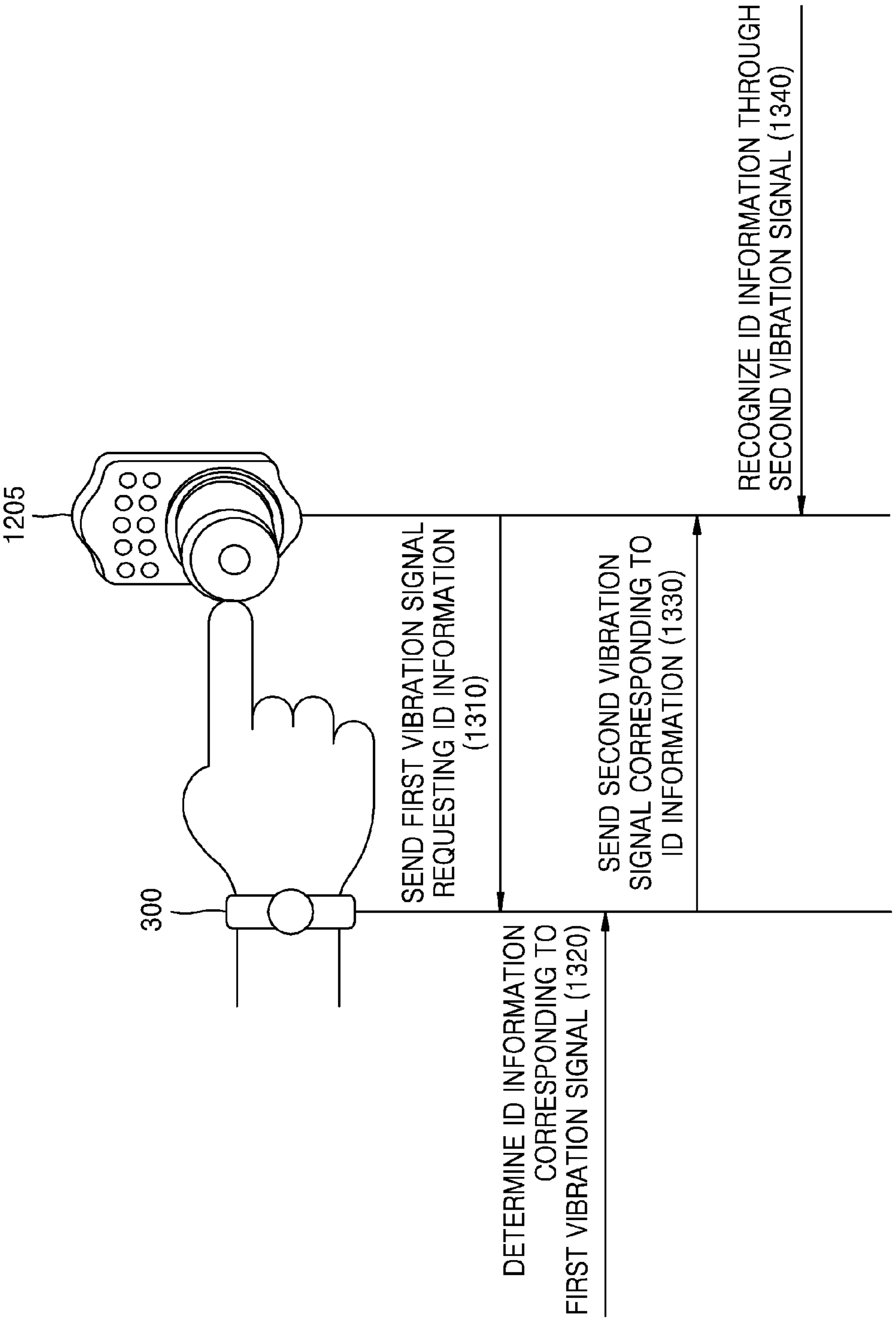
FIG. 13 is a diagram illustrating example communication between a wearable device and an external device.

FIG. 13 is a diagram illustrating example communication between the wearable device 300 and the external device 1205.

As illustrated in FIG. 13, the wearable device 300 may, for example, be a watch type wearable device worn on a user's wrist. The external device 1205 may, for example, be a door lock system. According to another example embodiment, the external device 1205 may be a portable terminal.

In operation 1310, the external device 1205 delivers a first vibration signal requesting identification (ID) information to the wearable device 300 if a body part of a user wearing the wearable device 300 contacts the external device 1205. Thus, the wearable device 300 senses the first vibration signal through the user's body part contacting the external device 1205.

In operation 1320, the wearable device 300 determines ID information to be delivered to the external device 1205, based on the sensed first vibration signal. More specifically, the wearable device 300 recognizes first data requesting the ID information through the first vibration signal. The wearable device 300 then determines the ID information to be delivered to the external device 1205, which corresponds to the first data.

In operation 1330, the wearable device 300 applies a second vibration signal corresponding to the determined ID information to the user's body part to deliver the second vibration signal to the external device 1205. For example, the wearable device 300 converts the ID information into the second vibration signal and applies the converted second vibration signal to the user's body part, thus delivering the second vibration signal to the external device 1205.

In operation 1340, the external device 1205 recognizes the ID information through the second vibration signal. Thus, the external device 1205 releases a lock function if the recognized ID information is proper ID information.

Figure 14:
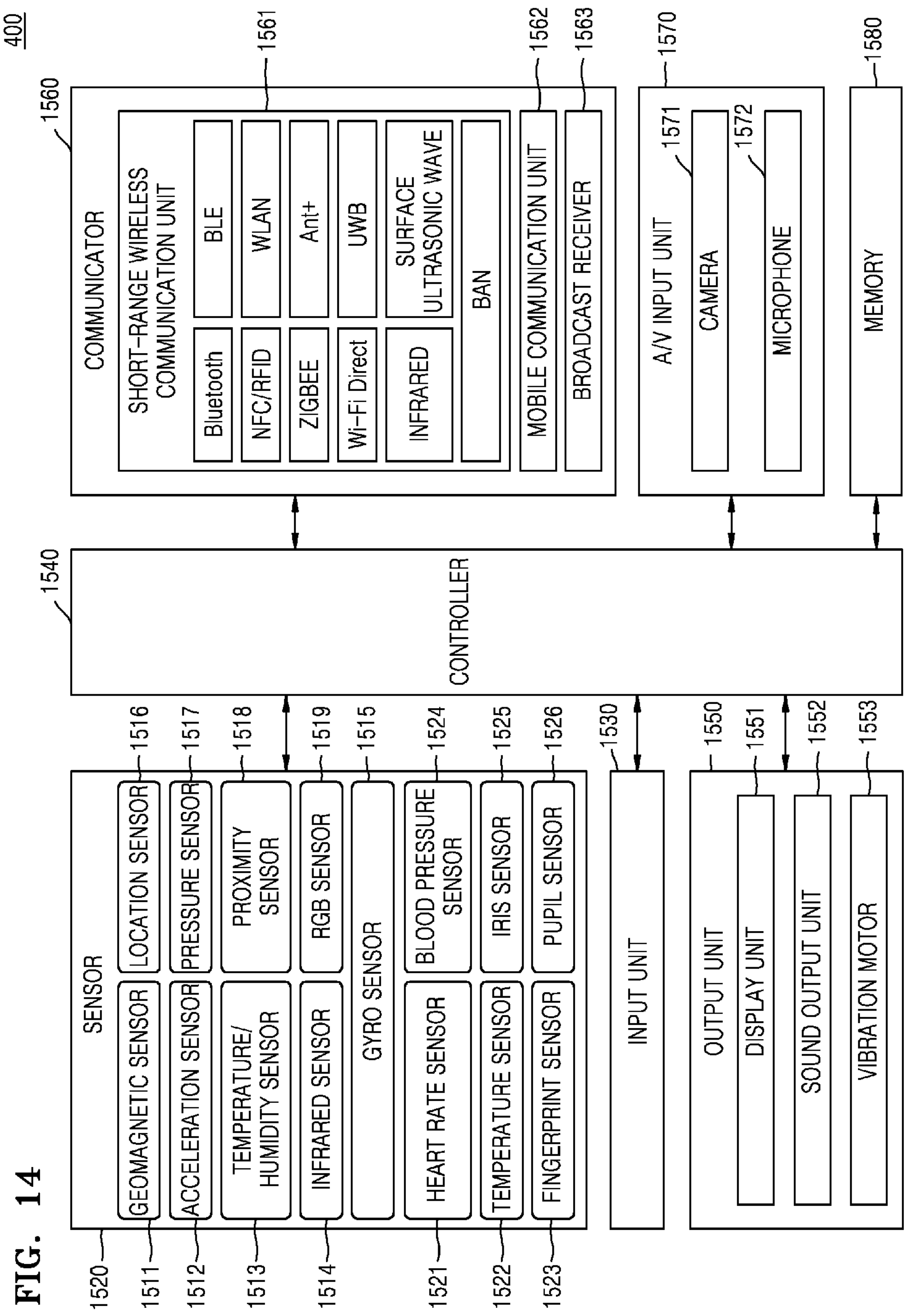
FIG. 14 is a block diagram illustrating an example wearable device.

FIG. 14 is a block diagram illustrating an example wearable device 400.

According to an example embodiment, the wearable device 400 may include a sensor (e.g., including a plurality of sensors) 1520, an input unit (e.g., including input circuitry) 1530, a controller (e.g., including processing circuitry) 1540, an output unit (e.g., including output circuitry) 1550, a communicator (e.g., including communication circuitry) 1560, an audio/video (AN) input unit (e.g., including AN input circuitry) 1570, and a memory 1580. For the wearable device 400 illustrated in FIG. 14, only elements associated with the current embodiment are illustrated in FIG. 14. Thus, it will be understood by those of ordinary skill in the art that the wearable device 400 may further include other general-purpose elements in addition to the elements illustrated in FIG. 14.

The wearable devices 100, 100*a*, 100*b*, 200, 200*a*, and 300 of FIGS. 1, 4, 5, 7, 10, and 12 may perform all functions performed by the wearable device 400 of FIG. 14 or some of them.

The sensor 1520 senses a state of the wearable device 400 or a state of the surrounding of the wearable device 400, a state of a user, and a state of the surrounding of the user, and delivers sensed information to the controller 1540.

The sensor 1520 may include, but not limited to, one or more of a geomagnetic sensor 1511, an acceleration sensor 1512, a temperature/humidity sensor 1513, an infrared (IR) sensor 1514, a gyroscope sensor 1515, a location sensor (e.g., a global positioning system (GPS)) 1516, a pressure sensor 1517, a proximity sensor 1518, an RGB (or illuminance) sensor 1519, a heart rate sensor 1521, a temperature sensor 1522, a fingerprint sensor 1523, a blood pressure sensor 1524, an iris sensor 1525, and a pupil sensor 1526. For example, the sensor 1520 may further include an electrocardiogram (ECG) sensor, and so forth. Functions of the respective sensors may be intuitively construed from names of the sensors by those of ordinary skill in the art, and thus will not be described in detail.

For example, the sensor 1520 may detect wearing of the wearable device 400. The sensor 1520 may obtain user's authentication information. The sensor 1520 obtains at least one biometric information of the user. The sensor 1520 obtains at least one environment information of the user.

The sensor 1520 may be divided into a plurality of sensing units depending on functions. For example, the sensor 1520 may include a first sensing unit that detects wearing of the wearable device 400, a second sensing unit that obtains the user's authentication information, a third sensing unit that obtains the user's biometric information, and a fourth sensing unit that obtains the user's environment information.

The sensor 1520 is activated or deactivated based on a state of the wearable device 400. For example, the first sensing unit that detects wearing of the wearable device 400 may be activated if the wearable device 400 is in a power-on state. The second sensing unit that obtains the user's authentication information may be activated after the wearing of the wearable device 400 is detected by the first sensing unit. The third sensing unit that obtains the user's biometric information and the fourth sensing unit that obtains the user's environment information may be activated after the user is authenticated.

At least one of the first sensing unit, the second sensing unit, the third sensing unit, and the fourth sensing unit may be deactivated once the wearable device 400 activates a function based on the user's biometric information or activates a function based on the user's biometric information and environment information.

The controller 1540 is typically configured to control an overall operation of the wearable device 400. For example, the controller 1540 may be configured to control overall operations of the sensor 1520, the input unit 1530, the output unit 1550, the communicator 1560, and the AN input unit 1570 by executing programs stored in the memory 1580.

For example, once the wearing of the wearable device 400 is detected by the sensor 1520, the controller 1540 authenticates the user based on authentication information obtained by the sensor 1520. The controller 1540 identifies the user through a vibration signal once the wearing of the wearable device 400 is detected by the sensor 1520. The controller 1540 activates at least one functions based on the biometric information obtained by the sensor 1520. The controller 1540 activates at least one functions based on the biometric information and the environment information obtained by the sensor 1520.

The input unit 1530 refers to a means with which the user inputs data for controlling the wearable device 400. For example, the input unit 1530 may include, but not limited to various input circuitry, such as, for example, a key pad, a dome switch, a touch pad (a capacitive type, a resistive type, an infrared beam type, a source acoustic wave type, an integral strain gauge type, a piezoelectric effect type, or the like), a jog wheel, a jog switch, or the like.

For example, the input unit 1530 may receive an input for setting a function to be activated and receive an input for setting conditions of the biometric information for activating the function.

The A/V input unit 1570 includes circuitry that is used to input an audio signal or a video signal, and may include a camera 1571 and a microphone 1572. The camera 1571 obtains an image frame such as a still image or a moving image through an image sensor in a video communication mode or a photographing mode. An image captured using the image sensor may be processed by the controller 1540 or a separate image processing unit (not illustrated).

The A/V input unit 1570 may be included in the sensor 1520 according to an implementation type of the wearable device 400.

The image frame processed by the camera 1571 is stored in the memory 1580 or transmitted to outside through the communicator 1560. Two or more cameras 1571 may be provided according to a configuration aspect of a terminal.

The microphone 1572 receives an external audio signal and processes the external audio signal into electric voice data. For example, the microphone 1572 may receive an audio signal from an external device or a speaking person. The microphone 1572 may use various noise cancellation algorithms for canceling noise generated during reception of the external audio signal.

The output unit 1550 includes circuitry for outputting an audio signal, a video signal, or a vibration signal, and may include a display unit (e.g., including a display panel) 1551, an audio output unit (e.g., including audio output circuitry) 1552, and a vibration motor 1553.

The display unit 1551 displays and outputs information processed by the wearable device 400. For example, the display unit 1551 may display a user interface (UI) for selecting a virtual image, a UI for setting an operation of the virtual image, and a UI for purchasing an item of the virtual image.

When the display unit 1551 and a touch pad are configured as a touch screen by forming a layer structure, the display unit 1551 may be used as an input device as well as an output device. The display unit 1551 may include at least one of a liquid crystal display (LCD), a thin film transistor (TFT) LCD, an organic light-emitting diode (OLED), a flexible display, a three-dimensional (3D) display, and an electrophoretic display. According to an implementation type, the wearable device 1400 or 150 may include two or more display units 1551. The two or more display units 1551 may be disposed to face each other using a hinge.

The audio output unit 1552 outputs audio data received from the communicator 1560 or stored in the memory 1580. The audio output unit 1552 outputs an audio signal associated with a function performed by the wearable device 400 (e.g., a call signal receiving sound, a message receiving sound, an alarm sound, or the like). The audio output unit 1552 may include a speaker, a buzzer, or the like.

The vibration motor 1553 outputs a vibration signal. For example, the vibration motor 1553 may output a vibration signal corresponding to output of audio data or video data (e.g., a call signal receiving sound, a message receiving sound, or the like). The vibration motor 1553 may output a vibration signal if a touch is input to a touch screen.

The communicator 1560 may include one or more elements, such as, for example, communication circuitry) enabling data communication between the wearable device 400 and an external device or between the wearable device 400 and a server. For example, the communicator 1560 may include a short-range communicator 1561, a mobile communicator 1562, and a broadcast receiver 1563.

The short-range wireless communicator 1561 may include communication circuitry including, but not limited to, a Bluetooth communicator, a Bluetooth low energy (BLE) communicator, a near field communication (NFC) unit, a wireless local area network (WLAN) (wireless fidelity (WiFi)) communicator, a ZigBee communicator, an infrared data association (IrDA) communicator, a WiFi direct (WFD) communicator, an ultra-wideband (UWB) communicator, an Ant+ communicator, an IR communicator, an ultrasonic communicator, and a body area network (BAN) communicator.

The mobile communicator 1562 transmits and receives a wireless signal to and from at least one of a base station, an external terminal, and a server on a mobile communication network. Herein, the wireless signal may include various forms of data corresponding to transmission and reception of a voice call signal, a video communication call signal, or a text/multimedia message.

The broadcast receiver 1563 receives a broadcast signal and/or broadcasting-related information from outside through a broadcasting channel. The broadcasting channel may include a satellite channel, a terrestrial channel, or the like. According to an implementation example, the wearable device 400 may not include the broadcast receiver 1563.

For example, the communicator 1560 may communicate with the external device.

The memory 1580 may store a program for processing and control operations of the controller 1540, and data input to the wearable device 400 or data output from the wearable device 400.

The memory 1580 may include a storage medium of at least one type of a flash memory type memory, a hard disk type memory, a multimedia card micro type memory, a card type memory (e.g., a secure digital (SD) or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

For example, the memory 1580 may store conditions of the biometric information for activating a function.

The apparatus according to the example embodiments may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer-readable code executable by the processor on a non-transitory computer-readable media such as magnetic storage media (e.g., magnetic tapes, hard disks, floppy disks), optical recording media (e.g., compact disk (CD)-Read Only Memories (CD-ROMs), digital versatile discs (DVDs), etc.), and solid state memory (e.g., random-access memory (RAM), ROM, static random-access memory (SRAM), electrically erasable programmable read-only memory (EEPROM), flash memory, thumb drives, etc.). The non-transitory computer-readable recording media may also be distributed over network coupled computer systems so that the computer-readable code is stored and executed in a distributed fashion. This non-transitory computer-readable recording media may be read by the computer, stored in the memory, and executed by the processor.

Embodiments may be described in terms of functional block components and various processing steps. Such functional blocks may be realized by any number of hardware and/or software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements of the embodiments are implemented using software programming or software elements, the embodiment may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments may employ any number of existing techniques for electronics configuration, signal processing and/or control, data processing and the like. The words "mechanism", "element", "means", and "construction" are used broadly and are not limited to mechanical or physical embodiments, but may include software routines in conjunction with processors, etc.

The particular implementations illustrated and described herein are illustrative examples of the various example embodiments and are not intended to otherwise limit the scope of the embodiment in any way. For the sake of brevity, existing electronics, control systems, software, and other functional aspects of the systems may not be described in detail. Furthermore, the connecting lines or connectors shown in the various figures presented are intended to represent functional relationships and/or physical or logical couplings between the various elements. It should be noted that many alternative or additional functional relationships, physical connections, or logical connections may be present in a practical device.

The use of the term "the" and similar referents in the context of describing the embodiment (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the description as if it were individually recited herein. Finally, the steps of all methods described herein are performable in any suitable order unless otherwise indicated herein or otherwise clearly contradicted by context. The use of any and all examples or exemplary language (e.g., "such as") provided herein, is intended merely to better illuminate the embodiments and does not pose a limitation on the scope of the embodiments unless otherwise claimed. Moreover, it is well understood by one of ordinary skill in the art that numerous modifications, adaptations, and changes may be made under design conditions and factors without departing from the spirit and scope of the embodiments as defined by the following claims and within the range of equivalents thereof.

It should be understood that example embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A wearable device which provides data to an external device through a body of a user, the wearable device comprising:

a vibration delivery unit comprising vibration delivery circuitry configured to convert data into a vibration signal;

a processor configured to determine a frequency response of the user based on a frequency response characteristic of the user's body; adjust a carrier frequency based on the determined frequency response to determine the carrier frequency based on the frequency response of the user's body, and to control the vibration delivery unit to convert data related to a preset operation of the external device into a vibration signal and to deliver the vibration signal to the external device via the determined carrier frequency through the body of the user, wherein the vibration signal delivered to the external device is used for the external device to perform the preset operation.

2. The wearable device of claim 1, wherein the processor is further configured to convert the data into the vibration signal based on characteristics of the body of the user.

3. A wearable device which provides data to an external device through a body of a user, the wearable device comprising:

a vibration delivery unit comprising vibration delivery circuitry configured to convert data into a vibration signal, a processor configured to control the vibration delivery unit to convert data related to a preset operation of the external device into a vibration signal and to deliver the vibration signal to the external device through the body of a user, wherein the vibration signal delivered to the external device is used for the external device to perform the preset operation; and wherein the processor is further configured to adjust and determine strength of the vibration signal to be output by the wearable device based on a characteristic of the body of a user and to convert the data into the vibration signal having the determined strength.

4. The wearable device of claim 1, further comprising a microphone configured to receive a voice input, wherein the processor is further configured to determine the data for controlling the preset operation based on the received voice input.

5. The wearable device of claim 1, further comprising an input unit comprising input circuitry configured to receive a character input, wherein the processor is further configured to determine the data for controlling the preset operation based on the received character input.

6. The wearable device of claim 1, further comprising a support which is adjacent to the vibration delivery unit, said support being configured to restrict delivery of the vibration signal in a direction opposite to a direction toward the body of the user.

7. The wearable device of claim 1, wherein the external device comprises a door lock device, and the data comprises a password for releasing a lock function of the door lock device.

8. The wearable device of claim 1, wherein the external device comprises a mobile device, and the data comprises a password for releasing a lock function of the mobile device.

9. The wearable device of claim 1, further comprising a microphone configured to sense a sound generated based on the vibration signal applied to the body of the user, wherein the processor is further configured to determine a strength of the vibration signal based on the sensed sound.

10. A method of providing, by a wearable device, data to an external device through a body of a user, the method comprising:

determining data related to a preset operation of the external device; and controlling the wearable device to convert data related to a preset operation of the external device into a vibration signal and to deliver the vibration signal to the external device through the body of the user, wherein the vibration signal delivered to the external device is used for the external device to perform the preset operation, and adjusting and determining strength of the vibration signal to be output by the wearable device based on a characteristic of the body of a user of the wearable device, and converting the data into a vibration signal having the determined strength.

11. The method of claim 10, further comprising receiving a voice input, wherein the determining of the data comprises determining the data for controlling the preset operation based on the received voice input.

12. The method of claim 10, further comprising receiving a character input, wherein the determining of the data comprises determining the data for controlling the preset operation based on the received character input.

13. The method of claim 10, wherein the vibration signal is applied to the body of the user, and delivery of the vibration signal in a direction opposite to a direction toward the body of the user is restricted by a support which is adjacent to the vibration delivery unit.

14. The method of claim 10, wherein the external device comprises a door lock device, and the data comprises a password for releasing a lock function of the door lock device.

15. The method of claim 10, wherein the external device comprises a mobile device, and the data comprises a password for releasing a lock function of the mobile device.

16. The method of claim 10, further comprising:

sensing a sound generated based on the vibration signal applied to the body of the user; and determining a strength of the vibration signal based on the sensed sound.

17. A non-transitory computer-readable recording medium having recorded thereon a program which, when executed by a computer, performs the method of claim 10.

* * * * *